(12) United States Patent
Matsuura et al.

(10) Patent No.: US 9,450,497 B2
(45) Date of Patent: Sep. 20, 2016

(54) CURRENT RESONANCE DC-DC CONVERTER

(71) Applicant: TDK Corporation, Minato-ku, Tokyo (JP)

(72) Inventors: Ken Matsuura, Tokyo (JP); Yoichi Ishizuka, Nagasaki (JP); Akinori Hariya, Nagasaki (JP)

(73) Assignee: TDK Corporation (JP)

( * ) Notice: Subject to any disclaimer, the term of this patent is extended or adjusted under 35 U.S.C. 154(b) by 99 days.

(21) Appl. No.: 14/499,681

(22) Filed: Sep. 29, 2014

(65) Prior Publication Data

US 2015/0263631 A1  Sep. 17, 2015

(30) Foreign Application Priority Data

Mar. 14, 2014  (JP) ................. 2014-052073

(51) Int. Cl.
*H02M 3/335*    (2006.01)
*H02M 3/337*    (2006.01)
*H02M 1/00*     (2006.01)

(52) U.S. Cl.
CPC ....... *H02M 3/33546* (2013.01); *H02M 3/3376* (2013.01); *H02M 3/33576* (2013.01); *H02M 2001/0058* (2013.01); *Y02B 70/1491* (2013.01)

(58) Field of Classification Search
CPC ............. H02M 3/28; H02M 3/33569; H02M 3/3376; H02M 3/33507; H02M 7/5387; H02M 7/53871; Y02B 70/1433
USPC ...... 363/15–16, 17, 21.02, 21.03, 56.02, 95, 363/98
See application file for complete search history.

(56) References Cited

U.S. PATENT DOCUMENTS

| 6,934,167 B2 * | 8/2005 | Jang ........................ H02J 5/005 363/21.02 |
| 7,843,708 B2 * | 11/2010 | Seong ................. H02M 3/3376 363/127 |

FOREIGN PATENT DOCUMENTS

JP    H08-289540 A    11/1996

* cited by examiner

*Primary Examiner* — Nguyen Tran
(74) *Attorney, Agent, or Firm* — Harness, Dickey & Pierce, P.L.C.

(57) ABSTRACT

A current resonance DC-DC converter includes a transformer, a switching circuit connected to a primary winding and having a pair of first and second primary side switches which alternately perform ON and OFF operations, an AC-DC conversion circuit connected to a secondary winding and having a pair of first and second secondary side switches which alternately perform the ON and OFF operations and a control circuit that synchronously turns the switches ON and OFF in consideration of a dead time period. The dead time period is provided immediately before and after an ON period of the first and second primary switches. A lag time period is provided immediately before the dead time period. The control circuit turns the first and second secondary side switches ON at the lag time period and turns the first and second secondary side switches OFF at an expiration of the dead time period.

16 Claims, 5 Drawing Sheets

[st5]

[st6]

CURRENT RESONANCE DC-DC CONVERTER

CROSS-REFERENCE TO RELATED APPLICATION

This application claims priority to Japanese Patent Application No. 2014-052073 filed Mar. 14, 2014 which is hereby expressly incorporated by reference herein in its entirety.

BACKGROUND

The present invention relates to a current resonance DC-DC converter that is configured with a switching circuit, a resonance circuit and an AC-DC conversion circuit. Specifically, in the current resonance DC-DC converter, the switching circuit and the resonance circuit are connected to a primary winding of a transformer of the current resonance DC-DC converter. Further, the AC-DC conversion circuit is connected to a secondary winding of the transformer of the current resonance DC-DC converter. Further, the switching circuit has a bridge circuit configuration that has at least a pair of first switches that alternately perform ON and OFF operations. The resonance circuit generates a resonance current in the primary winding of the transformer. The AC-DC conversion circuit converts an AC voltage that is induced in the secondary winding of the transformer into a DC voltage and outputs the DC voltage.

As this kind of DC-DC converter, Japanese Publication Number JP H08-289540 discloses a DC-DC converter that is used in a switching power supply device. In this DC-DC converter, a first capacitor for smoothing (also referred to as "a smoothing capacitor" below) that works as a DC power source of this circuit is connected between a pair of power supply terminals. Further, a series circuit of first and second switches (also referred to as "primary side switches" below) is connected to the smoothing capacitor in parallel. In this case, a pair of the primary side switches is composed with an insulated gate (a metal oxide semiconductor (MOS)) field effect transistor (FET). Thus, the pair of the primary side switches respectively includes a control switch that corresponds to an original FET function and a diode connected to the control switch in reverse parallel. Further, a capacitor for forming a partial resonance circuit is respectively connected to each primary side switch in parallel.

Further, a series circuit (an output resonance circuit) of the primary winding and a resonance capacitor that have a resonance inductance is connected between a node of the primary side switches (a connection middle point therebetween) and a lower end of the smoothing capacitor, i.e., a source of one of the primary side switches located on a low potential side (that is, the second switch). Further, the primary winding of the transformer has an excitation inductance that is equivalently connected to the primary winding in parallel in addition to an inductance that is composed with a leakage inductance.

Further, the secondary winding of the transformer is divided into first and second (secondary) windings by a center tap. One end of each is respectively connected to one end of an output smoothing capacitor via third and fourth diodes. The center tap is connected to the other end of the output smoothing capacitor. Further, a pair of output terminals for connecting a load (not shown) is connected to the output smoothing capacitor. A control circuit for making each of the primary side switches perform alternately ON and OFF operations makes an output voltage constant by changing ON and OFF frequencies of each of the primary side switches according to a change of an input voltage (a charging voltage for the smoothing capacitor) or an output voltage (a charging voltage for the output smoothing capacitor).

In this DC-DC converter, in a case in which the smoothing capacitor is already charged, when the primary side switch located on a high potential side of the pair of the primary side switches (that is, the first switch) is in an ON state, an electric current flows in a series resonance circuit, which is a closed circuit, by a series resonance. The series resonance circuit is configured with the smoothing capacitor, the primary side switch in the ON state mentioned above (the first switch), the primary winding and the resonance capacitor. Further, when the primary side switch located on the low potential side of the pair of the primary side switches (that is, the second switch) is an ON state, an electric current flows in a series resonance circuit, which is a closed circuit, by a series resonance. The series resonance circuit is configured with the resonance capacitor, the primary winding, and the primary side switch in the ON state mentioned above (the second switch). In this way as explained above, the series resonance circuit that is configured with the leakage inductance of the primary winding and the capacitor is driven by the ON and OFF operations of each of the primary side switches. As a result, output power that corresponds to an electric current (that is, electric power) generated by the series resonance is obtained at the secondary winding of the transformer. The DC-DC converter that has the configuration explained above corresponds to an LLC current resonance converter. The control circuit controls an output voltage as a constant by changing ON and OFF frequencies (by a frequency control) of the first and second switches within a frequency range in which output power greatly changes when a frequency is changed.

The conventional DC-DC converter described above, however, still has some problems to be solved. As an example, a case in which the primary side switch located on the low potential side (the second switch) is driven so as to be in an ON state in the DC-DC converter is explained. After an ON period of the primary side switch located on the high potential side (the first switch) is finished, during a dead time period that is defined between a time that the ON period of the first switch is finished and a time in which the primary side switch located on the low potential side (the second switch) is driven to be in the ON state, a capacitor that is connected to the primary side switch located on the low potential side (the second switch) in parallel is discharged (that is, a voltage between both ends of this primary side switch becomes zero volts) in accordance with an electric current that flows by a partial resonance in a path that includes the capacitor which is connected to the primary side switch located on the low potential side in parallel, a leakage inductance of the primary winding, and an excitation inductance. As a result, preparation for a zero volt switching of the primary side switch located on the low potential side is completed.

However, a current amount of the electric current, which flows by the partial resonance in the dead time period, depends on both a transmission electric current and an excitation current. The transmission electric current is transmitted from the primary winding to the secondary winding of the transformer. The excitation current flows in the excitation inductance of the primary winding. Specifically, the current amount of the electric current that flows by the partial resonance increases as a total of each current value of the transmission electric current and the excitation inductance is larger. Therefore, when a percentage of the transmission electric current for the excitation current is large (when the current amount of the electric current that flows by the partial resonance depends on a current value of the transmission electric current), the decreased current amount of the electric current that flows by the partial resonance is larger because the transmission electric current decreases under a light load. As a result, the following problem occurs: the capacitor that is connected to the primary side switch located on the low potential side in parallel cannot be adequately discharged so that the preparation for the zero volt switching of the primary side switch cannot be completed.

Further, the current amount of the electric current that flows by the partial resonance does not depend on the transmission electric current when the current value of the excitation current is large. For achieving that state, the excitation inductance needs to be decreased. As a result, it is necessary to provide a gap at a core of the transformer. However, when the gap is provided at the core, a radiation noise is generated because the magnetic flux expands outwardly from the core around the gap or an overcurrent loss is generated at the winding because the magnetic flux that expands outwardly crosses the winding that is wound around the core because the magnetic flux expands outwardly from the core around the gap. Each problem explained above similarly occurs even when the primary side switch located on the high potential side (the first switch) is driven to be in the ON state.

SUMMARY

The present invention attempts to solve these problems. An object of the present invention is to provide a current resonance DC-DC converter that can certainly make a primary side switch of a transformer perform a zero volt switching regardless of the transmission electric current value and without enlarging the excitation current.

To achieve the above object, a current resonance DC-DC converter according to one aspect of the present invention includes: a transformer that has a primary winding and a secondary winding; a switching circuit that is connected to the primary winding, that has a pair of first and second primary side switches which alternately perform ON and OFF operations, and that has a bridge configuration; an AC-DC conversion circuit that is connected to the secondary winding, that has four rectifying devices, that convert an alternating current voltage induced in the secondary wiring to a direct current voltage, and that outputs the direct current voltage, two of the four rectifying devices located at a reference potential side being a pair of first and second secondary side switches which alternately perform the ON and OFF operations; and a control circuit that alternately turns the first and second primary side switches ON and OFF in consideration of a dead time period, that synchronously turns the first primary and secondary side switches ON and OFF, and that synchronously turns the second primary and secondary side switches ON and OFF. The dead time period is provided at right before and right after an ON period of the first and second primary switches. A lag time period is provided right before the dead time period. The control circuit turns the first and second secondary side switches ON at a beginning time of the lag time period and turns the first and second secondary side switches OFF at an ending time of the dead time period.

In the current resonance DC-DC converter according to the aspect of the present invention, the control circuit keeps turning on the first and second secondary side switches from the beginning time of the lag time period and after the control circuit turns the first and second primary side switches OFF and until the ending time of the dead time period.

In the current resonance DC-DC converter according to the aspect of the present invention, the first and second secondary side switches are turned ON at the same time during the lag time period.

In the current resonance DC-DC converter according to the aspect of the present invention, the dead time period is longer than the lag time period.

A method for operating a current resonance DC-DC converter according to one aspect of the present invention includes the current resonance DC-DC converter and the following steps. The current resonance DC-DC converter includes: a transformer that has a primary winding and a secondary winding; a switching circuit that is connected to the primary winding, that has a pair of first and second primary side switches which alternately perform ON and OFF operations, and that has a bridge configuration; an AC-DC conversion circuit that is connected to the secondary winding, that has four rectifying devices, that convert an alternating current voltage induced in the secondary wiring to a direct current voltage, and that outputs the direct current voltage, two of the four rectifying devices located at a reference potential side being a pair of first and second secondary side switches which alternately perform the ON and OFF operations; and a control circuit that alternately turns the first and second primary side switches ON and OFF in consideration of a dead time period, that synchronously turns the first primary and secondary switches ON and OFF, and that synchronously turns the second primary and secondary switches ON and OFF. The control circuit turns the first secondary side switch ON before a beginning time of the dead time period and before the control circuit turns the first primary side switch ON. After the control circuit turns the first primary side switch OFF, the control circuit turns the first secondary side switch OFF at an ending time of the dead time period. The control circuit turns the second secondary side switch ON before the beginning time of the dead time period and before the control circuit turns the second primary side switch ON. Further, after the control circuit turns the second primary side switch OFF, the control circuit turns the second secondary side switch OFF at the ending time of the dead time period.

In the method for operating a current resonance DC-DC converter according to the aspect of the present invention, the control circuit keeps turning on the first and second secondary side switches before the beginning time of the dead time period after the control circuit turns the first and second primary side switches OFF and until the ending time of the dead time period.

In the method for operating a current resonance DC-DC converter according to the aspect of the present invention, the first and second secondary side switches are turned ON at the same time during a predetermined period prior to the beginning time of the dead time period.

In the method for operating a current resonance DC-DC converter according to the aspect of the present invention, a time period between a turning ON time of the first and second secondary side switches and the beginning time of the dead time period is shorter than the dead time period.

According to the current resonance DC-DC converter of one aspect of the present invention, immediately before a commencement of a dead time period that is immediately before an operation state in which one primary side switch (a first primary side switch) changes from an OFF state to an ON state, a pair of the secondary side switches (first and second secondary side switches) are shifted to be ON states at the same time and both ends of the secondary winding are short-circuited by the pair of the secondary side switches. As a result, a period of an operation state in which the electric current in which a current value increases is generated at the secondary winding can be provided before the dead time period.

Therefore, in the DC-DC converter of one aspect of the present invention, a current value of an electric current that flows in a secondary side leakage inductance that is equivalently formed at the primary side of the transformer in the above operation state can be increased according to a current value of an electric current that is generated at the secondary winding. As a result, the electric current that flows in the primary winding (an electric current that flows in the other primary side switch (a second primary side switch) in its ON state, i.e., an electric current that flows in a primary side leakage inductance) can be increased. Therefore, during the dead time period immediately after this operation state, a current amount of the electric current that flows in each parasitic capacitance of the pair of the primary side switches that composes the electric current that continuously flows in the primary side leakage inductance can also be increased. As a result, according to the DC-DC converter of one aspect of the present invention, the parasitic capacitance of the one primary side switch (the first primary side switch) that is in the OFF state is certainly discharged by the electric current that flows in each of the parasitic capacitances in which the current amount increases. Thus, a voltage between both ends of the parasitic capacitance, i.e., a voltage that is applied to the one primary side switch (the first primary side switch), can be decreases to zero volt. As a result, a preparation for a zero volt switching with respect to the one primary side switch (the first primary side switch) can be always and normally completed.

Further, according to the current resonance DC-DC converter of one aspect of the present invention, immediately before a commencement of a dead time period that is immediately before an operation state in which the other primary side switch (the second primary side switch) changes from an OFF state to an ON state, a pair of the secondary side switches (first and second secondary side switches) are shifted to be ON states at the same time and both ends of the secondary winding are short-circuited by the pair of the secondary side switches. As a result, a period of an operation state in which the electric current in which a current value increases is generated at the secondary winding can be provided before the dead time period.

Therefore, in the DC-DC converter of one aspect of the present invention, a current value of an electric current that flows in a secondary side leakage inductance that is equivalently formed at the primary side of the transformer in the above operation state can be increased according to a current value of an electric current that is generated at the secondary winding. As a result, the electric current that flows in the primary winding (an electric current that flows in the one primary side switch (the first primary side switch) in its ON state, i.e., an electric current that flows in a primary side leakage inductance) can be increased. Therefore, during the dead time period immediately after this operation state, a current amount of the electric current that flows in each parasitic capacitance of the pair of the primary side switches that composes the electric current that continuously flows in the primary side leakage inductance can also be increased. As a result, according to the DC-DC converter of one aspect of the present invention, the parasitic capacitance of the other primary side switch (the second primary side switch) that is in the OFF state is certainly discharged by the electric current that flows in each of the parasitic capacitances in which the current amount increases. Thus, a voltage between both ends of the parasitic capacitance, i.e., a voltage that is applied to the other primary side switch (the second primary side switch), can be decreases to zero volt. As a result, a preparation for a zero volt switching with respect to the other primary side switch (the second primary side switch) can be always and normally completed.

Therefore, during the period of the operation states in which the one primary side switch (the first primary side switch) is in the ON state and in which the other primary side switch (the second primary side switch) is in the ON state, the current resonance DC-DC converter of one aspect of the present invention can certainly make the pair of the primary side switches of the transformer perform the zero volt switching regardless of the current value of the electric current that flows in the secondary side leakage inductance (the transmission electric current), and at the same time, without enlarging an electric current that flows in the excitation inductance (the excitation current).

DESCRIPTION OF EXEMPLARY EMBODIMENTS

A current resonance DC-DC converter (also referred to as "a DC-DC converter" below) according to an embodiment of the present invention is explained below with reference to the drawings.

Figure 1:
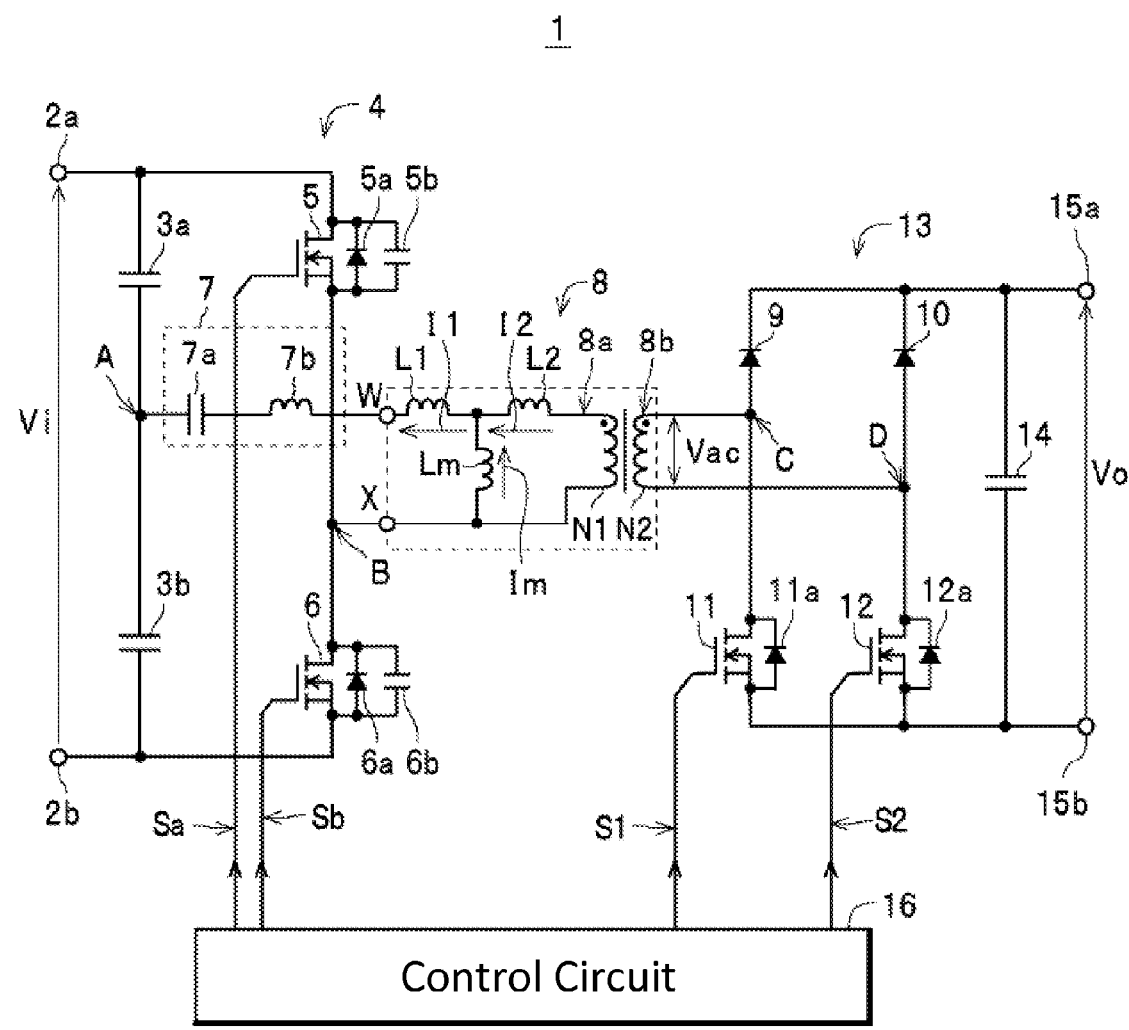
FIG. 1 is a circuit diagram that shows a current resonance DC-DC converter 1 according to an embodiment of the present invention.

First, a configuration of a DC-DC converter 1 shown in FIG. 1 according to the embodiment of the present invention is explained. As an example, the DC-DC converter 1 is configured with a switching circuit 4, a resonance circuit, a transformer 8, an AC-DC conversion circuit 13, an output capacitor 14, a pair of output terminals 15a, 15b (also referred to as "an output terminal 15" below, when not distinguished) and a control circuit 16. Specifically, the switching circuit 4 is configured with a pair of input terminals 2a, 2b (also referred to as "an input terminal 2" below, when not distinguished), a pair of input capacitors 3a, 3b and a pair of first switches 5, 6 (a pair of primary side switches (first and second primary side switches)). The AC-DC conversion circuit 13 is configured with four rectifying devices 9, 10, 11 and 12.

Therefore, the DC-DC converter 1 is configured with a LLC current resonance converter in which a circuit system of the switching circuit 4 corresponds to a half bridge type. An input voltage (a direct current (DC) voltage) Vi that is input to the input terminal 2 is converted into an output voltage (a DC voltage) Vo. The output voltage Vo is output from the output terminal 15.

The input voltage Vi is input between the pair of the input terminals 2a and 2b as shown in FIG. 1. The input voltage Vi is a state in which the input terminal 2a is positive with respect to the input terminal 2b as a reference. Further, the pair of the input capacitors 3a and 3b are connected in series with each other, and at the same time, are connected between the pair of the input terminals 2a and 2b in a state in which the input capacitor 3a is connected to the input terminal 2a and the input capacitor 3b is connected to the input terminal 2b.

The pair of the first switches 5 and 6, which configure the switching circuit 4 and which are connected in series with each other, is connected between the pair of the input terminals 2a and 2b. In the embodiment of the present invention, each of the first switches 5 and 6 is configured with an N channel Metal Oxide Semiconductor Field Effect Transistor that corresponds to a semiconductor switching element (the Field Effect Transistors respectively have parasitic diodes 5a, 6a and parasitic capacitances 5b, 6b). Further, a drain terminal of one first switch 5 (one primary side switch (a first primary side switch)) is connected to the input terminal 2a. A source terminal of the first switch 5 is connected to a drain terminal of the other first switch 6 (the other primary side switch (a second primary side switch)). Further, at the same time, a source terminal of the first switch 6 is connected to the input terminal 2b.

Therefore, the first switch 5 is configured as a primary side switch located on a high potential side and the first switch 6 is configured as a primary side switch located on a low potential side. Further, the first switches 5 and 6 are alternately performed ON and OFF operations by imputing driving signals Sa and Sb, which are output from the control circuit 16, to each gate terminal. Specifically, the first switches 5 and 6 are turned ON and OFF according to the driving signals Sa and Sb, respectively, in the state in which a predetermined dead time period is provided between ON periods of the first switches 5 and 6.

The resonance circuit 7, as an example, is configured with a resonance capacitor 7a and a resonance inductor 7b that are connected in series. Further, in the resonance circuit 7, one end of the resonance circuit 7 is connected to a node A connected between a pair of the input capacitors 3a and 3b, and at the same time, the other end of the resonance circuit 7 is connected to one end W of a primary winding 8a of the transformer 8 that is explained below. Further, each value of the resonance capacitor 7a and the resonance inductor 7b of the resonance circuit 7 is defined in advance so as to make the first switches 5 and 6 perform the zero volt switching by synchronizing a resonance frequency of the primary side of the transformer 8 by the resonance circuit 7 with the switching frequencies of the pair of the first switches 5 and 6 (frequencies of the driving signals Sa and Sb).

Further, a primary side leakage inductance L1 of the transformer 8 that is explained below also works as a resonance inductor in the same way as the resonance inductor 7b does. Therefore, a configuration in which the resonance inductor 7b is used in combination with the primary side leakage inductance L1 can be adopted. Alternatively, the resonance inductor can also be configured with only the primary side leakage inductance L1 without the resonance inductor 7b. Further, each of the input capacitors 3a and 3b according to the embodiment also works as the resonance capacitor in the same way as the resonance capacitor 7a does. Therefore, a configuration in which the resonance capacitor 7a is used in combination with each of the input capacitors 3a and 3b can be adopted. Alternatively, the resonance capacitor can also be configured with only each of the input capacitors 3a and 3b without the resonance capacitor 7a.

As shown in FIG. 1, the transformer 8 has a primary winding 8a and a secondary winding 8b that are electrically insulated each other. Further, a mark "●" shown in FIG. 1 shows polarities of the primary winding 8a and the secondary winding 8b. Further, the one end W of the primary winding 8a of the transformer 8 is connected to the resonance circuit 7 as explained above and the other end X is connected to a node B connected between the pair of the first switches 5 and 6. Further, the transformer 8 induces an alternating current (AC) voltage Vac from the primary winding 8a to the secondary winding 8b in accordance with the switching operation of the first switches 5 and 6 (in accordance with alternately turning the first switches 5 and 6 ON and OFF of).

Further, when parts that are shown with reference numerals N1 and N2 in FIG. 1 correspond to the ideal transformer, as shown in FIG. 1, the transformer 8 is equivalently provided with this ideal transformer, the primary side leakage inductance L1, a secondary side leakage inductance L2, and an excitation inductance Lm. The primary side leakage inductance L1 is generated by a leakage flux at the primary side (a side of the primary winding 8a). The secondary side leakage inductance L2 is obtained by converting a secondary side leakage inductance that is generated by a leakage flux at the secondary side (a side of the secondary winding 8b) into a value of the primary side. In this case, values of the leakage inductances L1 and L2 are equal.

The four second switches 9, 10, 11 and 12 that configure the AC-DC conversion circuit 13 are configured by connecting then with a full bridge connection form as shown in FIG. 1 (a full bridge type configuration). Further, the AC-DC conversion circuit 13 is provided between the secondary winding 8b of the transformer 8 and the pair of the output terminals 15a, 15b. The AC-DC conversion circuit 13 converts the AC voltage Vac that is induced at the secondary winding 8b into the output voltage Vo as the DC voltage. Then, the output voltage Vo is output between the pair of the output terminals 15a and 15b.

Specifically, a pair of the second switches 9 and 10 located on a positive potential side of the output voltage Vo among the four second switches 9, 10, 11 and 12 are configured with the diodes as the rectifying devices (also referred to as "diodes 9 and 10" below). Further, the second switches 9 and 10 can also be configured with synchronization rectifying devices such as a Field Effect Transistor (FET) that is controlled in order to perform a synchronous rectification operation by the control circuit 16.

Further, the remaining second switches 11 and 12 (the second switches 11 and 12 located on a reference potential side of the output voltage Vo) correspond to secondary side switches and are configured with an N channel Metal Oxide Semiconductor Field Effect Transistor that corresponds to a semiconductor switching element (the Field Effect Transistors (FET) that respectively have parasitic diodes 11*a* and 12*a*) (also referred to as "second switches 11 and 12" (first and second secondary side switches) below). Further, the two second switches 11 and 12 can also be configured with an N type bipolar transistor or a High Electron Mobility Transistor (HEMT) instead of the Field Effect Transistor that has the parasitic diode as explained above.

Further, the diode 9 and the second switch 11 (the one secondary side switch (the first secondary side switch)) are connected in series with each other by connecting an anode terminal of the diode 9 and a drain terminal of the Field Effect Transistor that configures the second switch 11. Further, a node C connected between the diode 9 and the second switch 11 is connected to one end of the secondary winding 8*b* of the transformer 8. Further, one terminal (a cathode terminal of the diode 9) of the series circuit of the diode 9 and the second switch 11 is connected to the positive potential side of the output voltage Vo (an output terminal 15*a*). Further, the other end of the series circuit (the source terminal of the Field Effect Transistor that configures the second switch 11) is connected to the reference potential side of the output voltage Vo (an output terminal 15*b*).

Further, the diode 10 and the second switch 12 (the other secondary side switch (the second secondary side switch)) are connected in series with each other by connecting an anode terminal of the diode 10 and a drain terminal of the Field Effect Transistor that configures the second switch 12. Further, a node D connected between the diode 10 and the second switch 12 is connected to the other end of the secondary winding 8*b* of the transformer 8. Further, one terminal (a cathode terminal of the diode 10) of the series circuit of the diode 10 and the second switch 12 is connected to the positive potential side of the output voltage Vo (the output terminal 15*a*). Further, the other end of the series circuit (the source terminal of the Field Effect Transistor that configures the second switch 12) is connected to the reference potential side of the output voltage Vo (the output terminal 15*b*).

Further, the second switches 11 and 12 are turned ON and OFF by driving signals S1 and S2 that are input to each gate terminal from the control circuit 16.

The output capacitor 14 is connected between the pair of the output terminals 15*a* and 16*b*, generates the output voltage (the DC voltage) Vo by smoothing a pulsating flow voltage that is output from the AC-DC conversion circuit 13 and outputs the generated output voltage Vo to a load (not shown) from the pair of the output terminals 15*a* and 16*b*.

Figure 2:
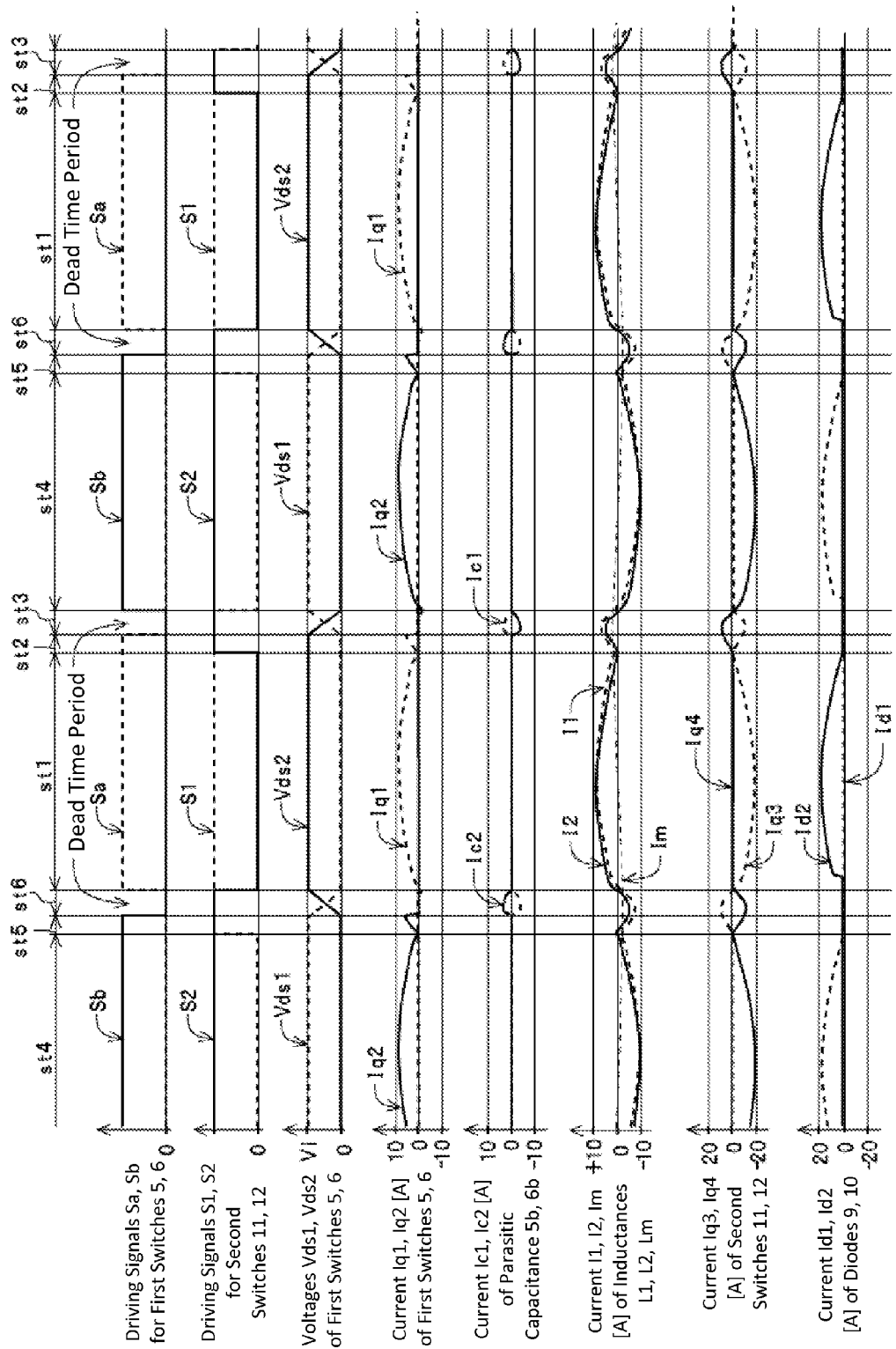
FIG. 2 is a waveform diagram to explain an operation of the current resonance DC-DC converter 1 according to an embodiment of the present invention.

The control circuit 16 is configured, for instance, by using a pulse generator. The driving signals Sa, Sb for the first switches 5, 6 and the driving signals S1, S2 for the second switches 11, 12 are generated and output by the control circuit 16. In this case, as shown in FIG. 2, the driving signals Sa and Sb are generated in a state in which the dead time period is provided between each ON period of the driving signals Sa and Sb with a predetermined frequency (for instance, the frequency within a range of several tens kHz and several hundred kHz) and with a predetermined duty ratio (for instance, about 0.48) and are output by the control circuit 16. Therefore, the control circuit 16 makes the first switches 5 and 6 alternately turn ON and OFF by the predetermined frequency, and at the same time, by the predetermined duty ratio in a state in which the predetermined dead time period is provided.

Because of the configuration explained above, i.e., the configuration in which the control circuit 16 does not control the ON and OFF frequencies of the first switches 5 and 6 based on the voltage value of the output voltage Vo, the output voltage Vo from the DC-DC converter 1 is changed according to a change of the input voltage Vi. This kind of DC-DC converter 1 is used as a bus converter that is a part of a dispersed power source system. The dispersed power source system is configured with, for example, a front end power source, the bus converter that is located at the latter part of the front end power source, a point of load (POL) that is located at the latter part of the bus converter.

On the other hand, as shown in FIG. 2, the control circuit 16 outputs the driving signal S1 in synchronization with the driving signal Sa and outputs the driving signal S2 in synchronization with the driving signal Sb. As a result, the one second switch 11 of the second switches 11 and 12 is turned ON and OFF in synchronization with the one first switch 5 of the first switches 5 and 6 by the control circuit 16. At the same time, the other second switch 12 of the second switches 11 and 12 is turned ON and OFF in synchronization with the other first switch 6 of the first switches 5 and 6 by the control circuit 16.

Specifically, as shown in FIG. 2, the control circuit 16 starts to output the driving signal S1 somewhat earlier than a commencement of the dead time period that is provided immediately before the output period of the driving signal Sa that is synchronization with the driving signal S1. At the same time, the control circuit 16 outputs the driving signal S1 at least throughout a period of time until a termination of the dead time period that is provided immediately after the output period of the driving signal Sa. Further, the control circuit 16 starts to output the driving signal S2 somewhat earlier than the commencement of the dead time period that is provided immediately before the output period of the driving signal Sb that is synchronization with the driving signal S2. At the same time, the control circuit 16 outputs the driving signal S2 at least throughout a period of time until a termination of the dead time period that is provided immediately after the output period of the driving signal Sb.

Because the control circuit 16 outputs each of the driving signals S1 and S2 as explained above, the one second switch 11 is shifted to an ON state somewhat earlier than the commencement of the dead time period that is provided immediately before the ON period of the one first switch 5 by the control circuit 16. At the same time, the one second switch 11 stays in the ON state at least throughout a period of time until a termination of the dead time period that is provided immediately after the ON period of this one first switch 5 by the control circuit 16. Further, the other second switch 12 is shifted to be an ON state somewhat earlier than the commencement of the dead time period that is provided immediately before the ON period of the other first switch 6 by the control circuit 16. At the same time, the other second switch 12 stays in the ON state at least throughout a period of time until a termination of the dead time period that is provided immediately after the ON period of this the other first switch 6 by the control circuit 16.

As a result, as shown in FIG. 2, the second switches 11 and 12 maintain the ON states at the same time throughout the period from the point in time that is somewhat earlier than the commencement of the dead time period of the first switches 5 and 6 until the termination of this dead time period.

Next, the operation of the DC-DC converter 1 is explained with reference to the drawings below. Further, the operation of the DC-DC converter 1 is explained with an example in which the resonance circuit 7 shown in FIG. 1 is omitted, and at the same time, the primary leakage inductance L1 of the transformer 8 is used as the resonance inductor and each of the input capacitors 3a and 3b are used as the resonance capacitor.

In the DC-DC converter 1, as shown in FIG. 2, the driving signals Sa and Sb (the driving signal Sa is shown with a broken line and the driving signal Sb is shown with a solid line) are generated with a predetermined frequency, and at the same time, with a predetermined duty ratio and are output by the control circuit 16. Further, the control circuit 16, as indicated by a broken line, starts to output the driving signal S1 somewhat earlier than the commencement of the dead time period that is provided immediately before the output period of the driving signal Sa that is synchronization with the driving signal S1. At the same time, the control circuit 16 outputs the driving signal S1 at least throughout a period of time until a termination of the dead time period that is provided immediately after the output period of the driving signal Sa (in this embodiment, the same time of the termination of this dead time period). Further, the control circuit 16, as indicated by a solid line, starts to output the driving signal S2 somewhat earlier than the commencement of the dead time period that is provided immediately before the output period of the driving signals Sb that is synchronization with the driving signal S2. At the same time, the control circuit 16 outputs the driving signal S2 at least throughout a period of time until a termination of the dead time period that is provided immediately after the output period of the driving signal Sb (in this embodiment, the same time of the termination of this dead time period).

Therefore, as shown in FIG. 2, in the DC-DC converter 1, the output state of the driving signal Sa, Sb and the driving signal S1, S2, are repeated. That is, six operation states of a first operation state st1, a second operation state st2, a third operation state st3, a fourth operation state st4, a fifth operation state st5 and a sixth operation state st6, which are distinguished according to the operation states (ON state/OFF state) of the first switches 5, 6 and the second switches 11, 12, are repeated in this order. The operations of the DC-DC converter 1 are explained for each operation state st1-st6 below. Further, with respect to each electric current shown in FIG. 2, a case in which an electric current flows in the first switches 5, 6 and the second switches 9-12 in the forward direction is shown with a positive polarity. A case in which an electric current flows in the parasitic capacitances 5b, 6b of the first switches 5, 6 and each of inductances L1, L2, Lm of the transformer 8 in an arrow direction is shown with the positive polarity.

Figure 3:
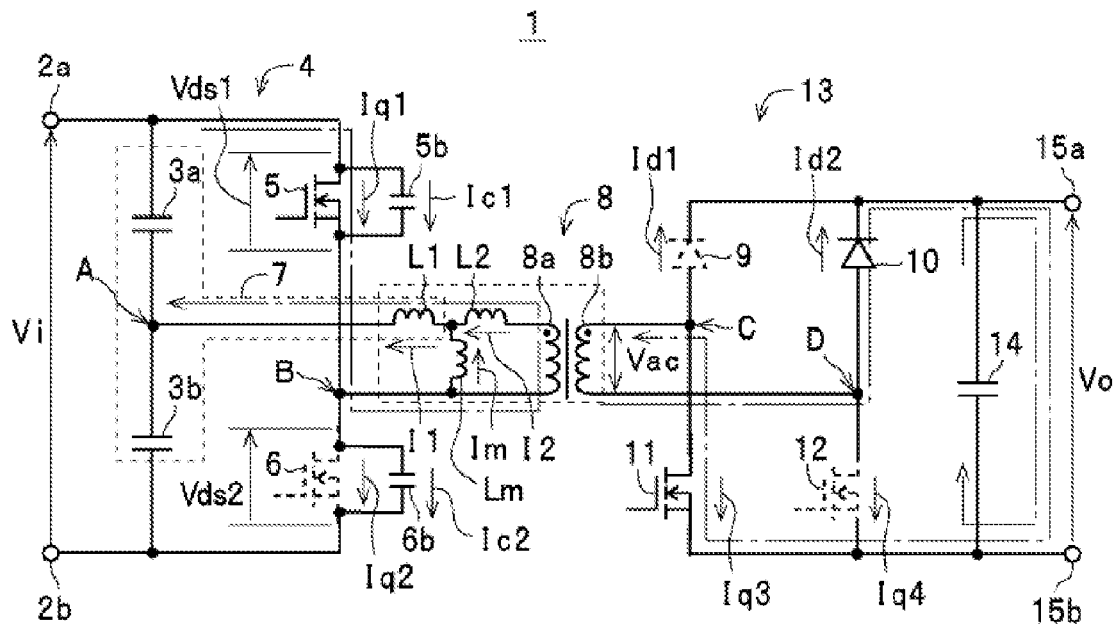
FIG. 3 is a circuit diagram to explain an operation in a first operation state st1 of the current resonance DC-DC converter 1 according to an embodiment of the present invention.

First of all, an operation of the DC-DC converter 1 in the first operation state st1 is explained with reference to FIGS. 2 and 3. In the first operation state st1, as shown in FIG. 3, the first switch 5 is in the ON state (the driving signal Sa is in an output state), the first switch 6 is in the OFF state (the driving signal Sb is in a stop state), the second switch 11 is in the ON state (the driving signal S1 is in the output state) and the second switch 12 is in the OFF state (the driving signal S2 is in the stop state). Further, in FIGS. 3-8, the switches that are in the ON states among the first switches 5, 6 and the second switches 9-12 are shown with solid lines. The switches that are in the OFF states are shown with broken lines. The other operation states are also the same below.

As a result, a voltage Vds1 between a source terminal and a drain terminal of the first switch 5, as indicated by the broken line in FIG. 2, stays at substantially zero volt. On the other hand, a voltage Vds2 between a source terminal and a drain terminal of the first switch 6, as indicated by the solid line in FIG. 2, stays at substantially the same voltage as the input voltage Vi. Therefore, in the first operation state St1, as shown in FIG. 2, a current Ic1 that flows in and out to/from the parasitic capacitance 5b of the first switch 5 is not generated (the current Ic1 stays at zero amperes). Also, a current Ic2 that flows in and out to/from the parasitic capacitance 6b of the first switch 6 is also not generated (the current Ic2 stays at zero amperes).

Further, as indicated by a dashed line in FIG. 3, the following electric current is generated at the primary side of the transformer 8. The electric current flows into the primary winding 8a from the input terminal 2a via the first switch 5 in the ON state and the node B, and respectively diverges and flows into the input capacitors 3a and 3b after reaching the node A via the primary winding 8a.

In this case, because the DC-DC converter 1 has a current resonance configuration, with respect to a current Iq1 (that is, an electrical current that flows into the primary winding 8a via the node B) that flows in the first switch 5, as indicated by the broken line in FIG. 2, a current value of the current Iq1 gradually increases from zero amperes. Further, the current value becomes the largest at about the intermediate point of the first operation state st1, and after that, the current value gradually decreases and flows with an arcuate waveform that reaches zero amperes. Further, a current Iq2 that flows in the first switch 6 in the OFF state stays at zero amperes. Further, because the electric current that flows into the primary winding 8a via the node B also corresponds to a current I1 that flows in the primary side leakage inductance L1, as indicated by the broken line in FIG. 2, the current I1 flows with as the same arcuate waveform as the current Iq1 flows with.

On the other hand, the input voltage Vi is applied to an edge of the node B of the excitation inductance Lm of the transformer 8 via the first switch 5 in the ON state. Further, the voltage of the node A (the input voltage Vi that is divided by the input capacitors 3a and 3b, i.e., a voltage of approximately ½ of the input voltage Vi) is applied to an edge of a side of the node A of the excitation inductance Lm via the primary side leakage inductance L1. As a result, because the voltage of approximately ½ of the input voltage Vi is applied to the excitation inductance Lm, as indicated by a finely broken line in FIG. 2, a current Im, which increases with a slope defined by an voltage value of the applied voltage explained above and an inductance value of the excitation inductance Lm, flows.

Further, as explained later, the voltage of approximately ½ of the input voltage Vi is applied to the excitation inductance Lm with an opposite polarity in the fourth operation state St4 in which the first switch 5 is in the OFF state (the driving signal Sa is in the stop state) and the first switch 6 is in the ON state (the driving signal Sb is the output state). Therefore, in the fourth operation state St4, a current Im that decreases with a slope as the same as in the first operation state st1 but in an opposite slope as in the first operation state st1 flows. Therefore, as indicated with the finely broken line in the waveform diagram with respect to the currents I1, I2, and Im that flow in each of the inductances L1, L2 and Lm in FIG. 2, the current Im that flows in the excitation inductance Lm becomes an electric current in which the current value changes with an approximately triangular waveform with respect to the zero amperes as a center.

Further, a current I2 flows in the secondary side leakage inductance L2 of the transformer 8. The current I2 is obtained by subtracting the current Im that flows in the excitation inductance Lm from the current I1 that flows in the primary side leakage inductance L1. Therefore, the current I2 flows with the current waveform that is indicated by a thick solid line in FIG. 2.

Further, in the state in which the current Iq1 flows into the primary winding 8a via the node B explained above, the AC voltage Vac is induced at the secondary winding 8b of the transformer 8 in the state in which the edge of the node D is the high potential side relative to the edge of the node C. Therefore, at the secondary side of the transformer 8, as indicated by the dashed line in FIG. 3, the electric current flows through a path that is configured as follows: the electric current reaches the output terminal 15a from the secondary winding 8b via the node D and the diode 10, continues flows via a load (not shown) that is connected between the output terminals 15a and 15b and goes back to the secondary winding 8b from the output terminal 15b via the second switch 11 in the ON state and the node C.

Therefore, currents Id2 and Iq3 respectively flow in the diode 10 and the second switch 11 that configure the current path explained above with the same current waveform. At the same time, the current waveform is the arcuate waveform that corresponds to the current waveform of the current I1 that flows in the primary winding 8a. Further, because both of the diode 9 and the second switch 12 are in the OFF states, currents Id1 and Iq4 that respectively flow in the diode 9 and the second switch 12 stay at zero amperes. Further, as indicated by the dashed line in FIG. 3, the electric current is supplied to the load as well from the output capacitor 14.

Figure 4:
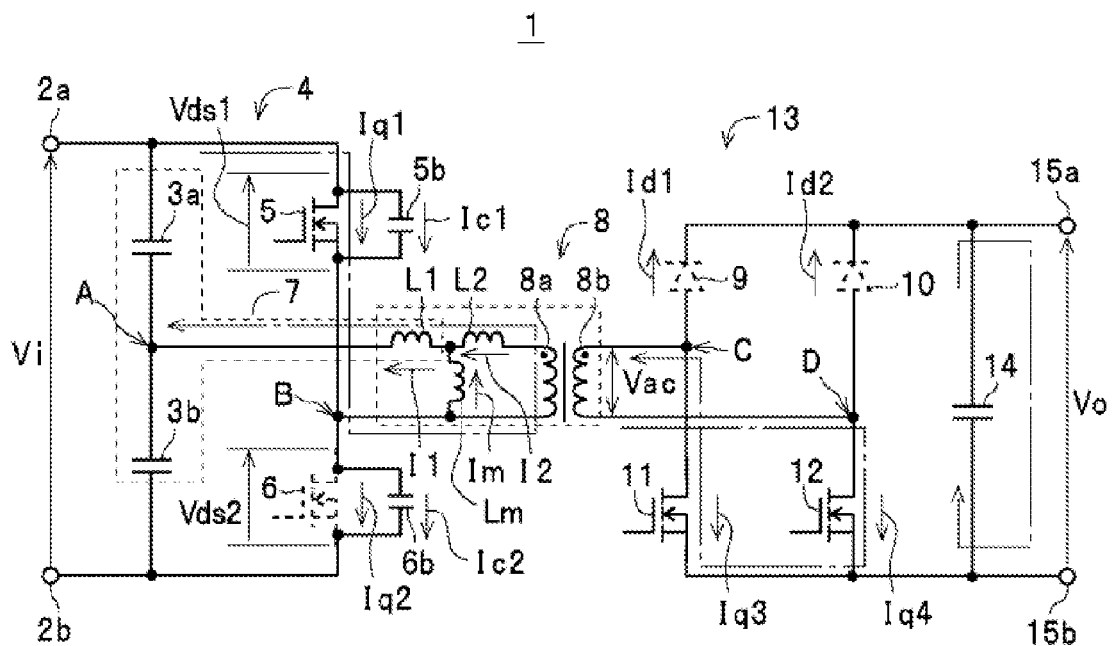
FIG. 4 is a circuit diagram to explain an operation in a second operation state st2 of the current resonance DC-DC converter 1 according to an embodiment of the present invention.

Next, an operation of the DC-DC converter 1 in the second operation state st2 is explained with reference to FIGS. 2 and 4. In the second operation state st2, as shown in FIG. 4, the first switch 5 continuously stays in the ON state (the driving signal Sa is in the output state), the first switch 6 also continuously stays in the OFF state (the driving signal Sb is in the stop state). At the same time, the second switch 11 also continuously stays in the ON state (the driving signal S1 is in the output state). In the above conditions, the second switch 12 is shifted to the ON state (the driving signal S2 is in the output state).

As a result, the secondary winding 8b of the transformer 8 becomes a state in which both ends of the secondary winding 8b are short-circuited by the second switches 11 and 12 that are both in the ON states. Further, because the first switch 5 stays in the ON state, the AC voltage Vac is continuously induced at the secondary winding 8b in the state in which the edge of the node D is the high potential side relative to the edge of the node C. Therefore, as indicated by the dashed line in FIG. 4, the electric current is generated and flows in the path that is from the secondary winding 8b via second switches 12 and 11, and goes back to the secondary winding 8b. In this case, this electric current (that is, the currents Iq3 and Iq4 that flow in the secondary switches 11 and 12) gradually increases from zero amperes with a slope defined by the voltage value of the AC voltage Vac and the inductance value of the secondary winding 8b. Further, in this state, because both of the two diodes 9 and 10 are shifted to be the OFF states, the electric current is not supplied to the output terminals 15a and 15b (the load) from the secondary winding 8b. However, as indicated by the dashed line in FIG. 4, the electric current is continuously supplied to the load from the output capacitor 14.

Further, at the primary side of the transformer 8, due to the electric current generation at the secondary winding 8b explained above, the current I2 in which the current value gradually increases with a defined slope from zero amperes is generated at the secondary leakage inductance L2 as well. Further, at the primary side of the transformer 8, as indicated by the dashed line in FIG. 4, the electric current is generated in the path that is configured as follows: the electric current reaches the primary winding 8a from the input terminal 2a via the first switch 5 in the ON state and the node B, and then respectively diverge to the input capacitors 3a and 3b after reaching the node A via the primary winding 8a.

The electric current at the primary side of the transformer 8 corresponds to the current Iq1 that flows in the first switch 5 in the ON state, and at the same time, corresponds to the current I1 that flows in the primary side leakage inductance L1. This current I1 is obtained by adding the current Im that flows in the excitation inductance Lm and the current I2 that flows in the secondary side leakage inductance L2. Therefore, the electric currents (that is, the currents Iq1 and I1) that flow in the path explained above are obtained by adding the current Im to the current I2 in which the electric current gradually increases with a predetermined slope from zero amperes. Therefore, with respect to the electric currents (that is, the currents Iq1 and I1) that flow in the path explained above in the second operation state st2, when the current value of the current Im at the point of an end time of the first operation state st1 is configured to the initial value, the current values gradually increase. Further, at the point of an end time of the second operation state st2, the current value increases to the current value that is obtained by adding the current value of the increased current I2 and the current value of the current Im at this point. That is, as the current value of the current I2 increases, it can be possible to increase the current value of the current (that is, the currents Iq1 and I1) that flows in the path explained above by the increased current amount of the current I2 as compared with the configuration in which the second operation state st2 is not provided.

Further, because the first switch 5 continuously stays in the ON state, the voltage Vds1 stays at zero volts. Further, because the first switch 6 also continuously stays in the OFF state, the voltage Vds2 stays at approximately the same voltage as the input voltage Vi, and at the same time, the current value of the current Iq2 stays at zero amperes. Further, because the diodes 9 and 10 continuously stay in the OFF states, both of the current values of the currents Id1 and Id2 that respectively flow in the diodes 9 and 10 correspond to zero amperes.

Figure 5:
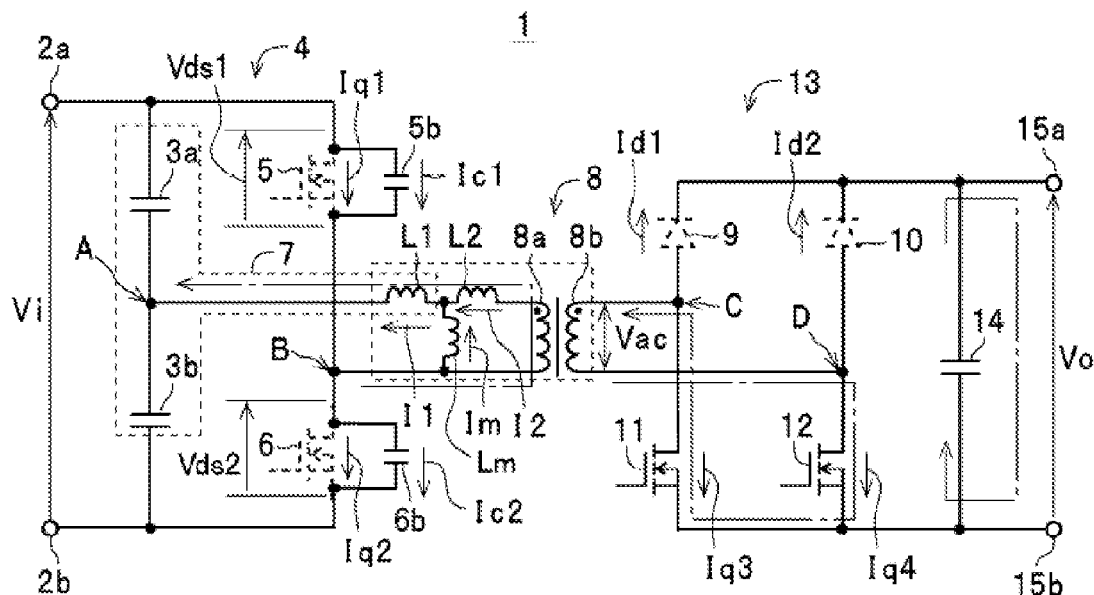
FIG. 5 is a circuit diagram to explain an operation in a third operation state st3 of the current resonance DC-DC converter 1 according to an embodiment of the present invention.

Next, an operation of the DC-DC converter 1 in the third operation state st3 is explained with reference to FIGS. 2 and 5. In the third operation state st3, as shown in FIG. 5, the first switch 6 continuously stays in the OFF state (the driving signal Sb is in the stop state), and at the same time, the second switches 11 and 12 continuously stay in the ON states (the driving signal S1 and S2 are in the output states). In the above conditions, the first switch 5 is shifted to be the OFF state (the driving signal Sa is in the stop state).

As a result, in the third operation state st3, because both of the first switches 5 and 6 at the primary side of the transformer 8 are the OFF states (that is, because the period of the third operation state st3 corresponds to the dead time period for the first switches 5 and 6), it is stopped to supply energy from the primary winding 8a to the secondary winding 8b of the transformer 8.

In this case, at the secondary side of the transformer 8, the secondary winding 8b of the transformer 8 releases energy that is accumulated until immediately before being shifted to the third operation state st3. As a result, at the secondary side of the transformer 8, as indicated by the dashed line in FIG. 5, the electric current in the same direction with the same path as the second operation state st2 that is performed immediately before the third operation state st3 is generated. The length of the period of the third operation state st3 is defined in advance so as to finish to release the energy that is accumulated at the secondary winding 8b and make the electric current (that is, the currents Iq3 and Iq4 the flow in the second switches 11 and 12) becomes zero amperes at the point of the end time. Further, in the third operation state st3, because the diodes 9 and 10 are continuously in the OFF states, both of the current values of the currents Id1 and Id2 that respectively flow in the diodes 9 and 10 stay at zero amperes. Further, as indicated by the dashed line in FIG. 5, the electric current is continuously supplied to the load from the output capacitor 14.

On the other hand, at the primary side of the transformer 8, the primary winding 8a of the transformer 8 releases energy as well that is accumulated until immediately before being shifted to the third operation state st3. As a result, at the primary winding 8a of the transformer 8, as indicated by the dashed line in FIG. 5, the electric current in the same direction with the same path (the path starts at the node B via the primary winding 8a, and reaches the node A) as in the second operation state st2 that is performed immediately before the third operation state st3 is generated.

The electric current that is generated at the primary winding 8a corresponds to the current I1 that flows in the primary side leakage inductance L1. The electric current I1 is obtained by adding the current Im (the electric current that flows in the excitation inductance Lm) and the current I2 (the electric current that flows in the secondary side leakage inductance L2) and is a resonance current. Specifically, the resonance current flows in the partial resonance circuit that is configured with the primary winding 8a, the input capacitors 3a, 3b and the parasitic capacitances 5b, 6b. Further, the electric current that is generated at the primary winding 8a is obtained by adding the current (the resonance current) Ic1 and the current (the resonance current) Ic2. Specifically, the current Ic1 flows in the parasitic capacitance 5b of the first switch 5 in a direction facing toward the node B (the same direction as the direction in FIG. 5). The current Ic2 flows in the parasitic capacitance 6b of the first switch 6 in the direction facing toward the node B (the opposite direction to the direction in FIG. 5). Therefore, during the generation period of the current I1, the parasitic capacitance 5b of the first switch 5 is charged with the current Ic1 that flows in the parasitic capacitance 5b. As a result, when a current amount (a total amount of the electric charges) of the current Ic1 that flows during the third operation state st3 is adequately large, a voltage between both ends of the parasitic capacitance 5b (that is, the voltage Vds1 between the source terminal and the drain terminal of the first switch 5) increases from zero volts up to the same voltage as the input voltage Vi.

Further, during the generation period of the current I1, the parasitic capacitance 6b of the first switch 6 is discharged by the current Ic2 that flows in the parasitic capacitance 6b. As a result, when a current amount (the total amount of the electric charges) of the current Ic2 that flows during the third operation state st3 is more than the amount of the electric charges that is charged in the parasitic capacitance 6b, a voltage between both ends of the parasitic capacitance 6b (that is, the voltage Vds2 between the source terminal and the drain terminal of the first switch 6) decreases from mostly the same voltage as the input voltage Vi to zero volts. As a result, a preparation for a zero volt switching with respect to the first switch 6 can be normally completed.

In this case, the initial value of each of the currents Ic1 and Ic2 in the third operation state st3 changes according to the current value of the current I1 that flew immediately before shifting to the third operation state st3. Specifically, the initial value becomes large when the current value of the current I1 is large, and the initial value becomes small when the current value of the current I1 is small. Further, each of the total amount of the electric charges of the currents Ic1 and Ic2 that flow during the third operation state st3 increases as each of the initial values becomes large. In the DC-DC converter 1 according to the embodiment of the present invention, the configuration in which the second operation state st2 explained above is shifted to the third operation state st3 is adopted. In the second operation state st2, because the current value of the current I1 increases due to the electric current that is generated at the secondary winding 8b of the transformer 8 as explained above, each of the total amount of the electric charges of the currents Ic1 and Ic2 that flows during the third operation state st3 increases. Therefore, in the DC-DC converter 1 according to the embodiment of the present invention, in the third operation state st3, the voltage between both ends of the parasitic capacitance 5b (the voltage Vds1 with respect to the first switch 5) certainly increases from zero volts up to mostly the same voltage as the input voltage Vi. Further, the voltage between both ends of the parasitic capacitance 6b (the voltage Vds2 with respect to the first switch 6) certainly decreases from mostly the same voltage as the input voltage Vi to zero volts. As a result, the preparation for the zero volt switching with respect to the first switch 6 can be always and normally completed.

Next, operations of the DC-DC converter 1 in the fourth operation state st4, the fifth operation state st5 and the sixth operation st6 are explained with reference to FIGS. 2, 6, 7 and 8.

Figure 6:
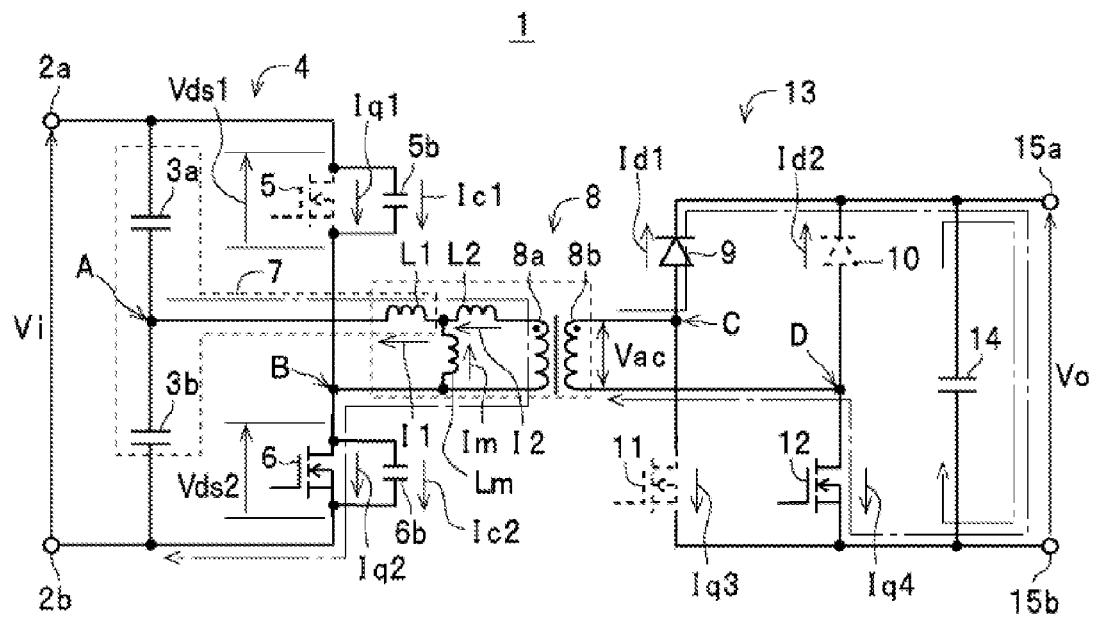
FIG. 6 is a circuit diagram to explain an operation in a fourth operation state st4 of the current resonance DC-DC converter 1 according to an embodiment of the present invention.

First, the operation of the DC-DC converter 1 in the fourth operation state st4 is explained with reference to FIGS. 2 and 6. In the fourth operation state st4, as shown in FIG. 6, an ON and OFF state with respect to the first switches 5 and 6, an ON and OFF state with respect to the diodes 9 and 10, and an ON and OFF state with respect to the second switches 11 and 12 are opposite from the states in the first operation state st1. According to this situation, as shown in FIG. 2, the state of each of the voltages Vds1 and Vds2, the state of each of the currents Iq1 and Iq2, the polarity of each of the currents I1, I2 and Im, the state of each of the currents Iq3 and Iq4, and the state of each of the currents Id1 and Id2 become opposite. However, the basic operation is the same as the operation in the first operation state st1.

Therefore, in the fourth operation state st4, as shown in FIG. 6, at the primary side of the transformer 8, in the state in which the current Iq2 flows in a path that starts from the node A and reaches the first switch in the ON state via the primary winding 8a and the node B, the AC voltage Vac is induced at the secondary winding 8b of the transformer 8 in the state in which the edge of the node C is the high potential side relative to the edge of the node D. Therefore, at the secondary side of the transformer 8, as indicated by the dashed line in FIG. 6, the electric current flows through a path that is configured as follows: the electric current reaches the output terminal 15a from the secondary winding 8b via the node C and the diode 9, flows via the load (not shown) that is connected between the output terminals 15a and 15*b* and goes back to the secondary winding 8*b* from the output terminal 15*b* via the second switch 12 in the ON state and the node D. Further, as indicated by the dashed line in FIG. 6, the electric current is supplied to the load from the output capacitor 14 as well.

Figure 7:
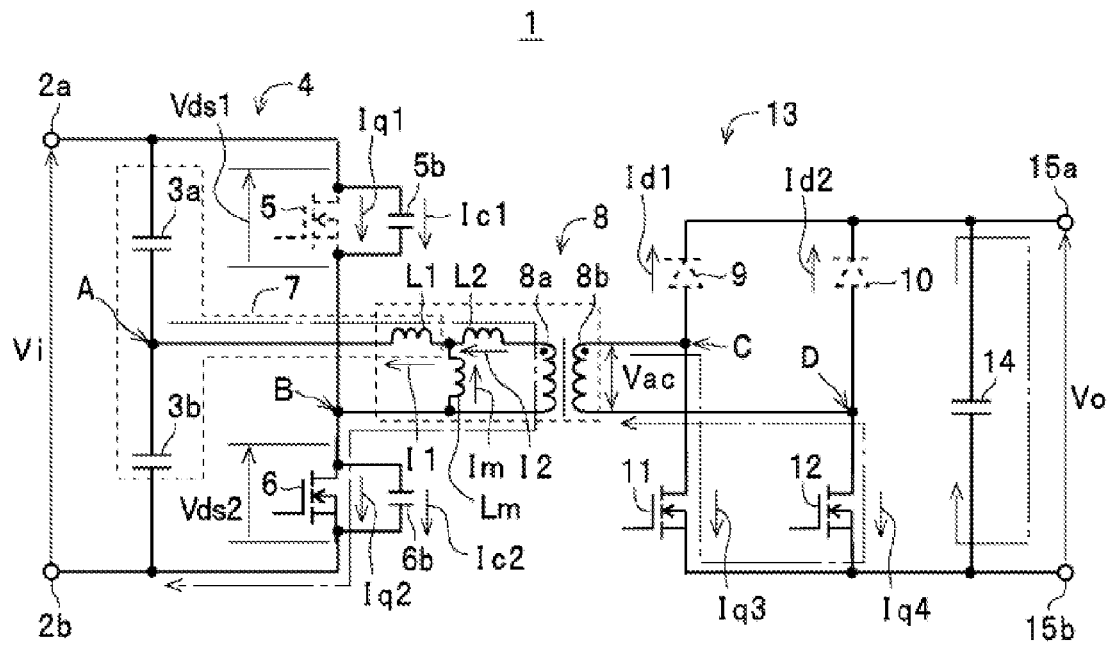
FIG. 7 is a circuit diagram to explain an operation in a fifth operation state st5 of the DC-DC converter 1 according to an embodiment of the present invention.

Next, an operation of the DC-DC converter 1 in the fifth operation state st5 is explained with reference to FIGS. 2 and 7. In the fifth operation state st5, as shown in FIG. 7, the ON and OFF state with respect to the first switches 5 and 6 is opposite from the states in the second operation state st2. The ON and OFF state with respect to the diodes 9 and 10 and the ON and OFF state with respect to the second switches 11 and 12 are the same as the states in the second operation state st2. According to this situation, as shown in FIG. 2, the state of each of the voltages Vds1 and Vds2, the state of each of the currents Iq1 and Iq2, the polarity of each of the currents I1, I2 and Im (directions of the electric currents), and the state of each of the currents Iq3 and Iq4 become opposite between the operations states st2 and st5. However, the basic operation is the same as the second operation state st2.

Therefore, in the fifth operation state st5, because the first switch 6 maintains the ON state, the AC voltage Vac is induced at the secondary winding 8*b* in the state in which the edge of the node C is the high potential side relative to the edge of the node D. As a result, at the secondary side of the transformer 8, as indicated by the dashed line in FIG. 7, the electric current is generated in a path that starts from the secondary winding 8*b* and returns to the secondary winding via the second switch 11 and the second switch 12. In this case, as shown in FIG. 2, this electric current (that is, the currents Iq3 and Iq4 that flow in the secondary switches 11 and 12) gradually increases from zero amperes with a slope defined by the voltage value of the AC voltage Vac and the inductance value of the secondary winding 8*b*.

Further, at the primary side of the transformer 8, due to the electric current generation at the secondary winding 8*b* explained above, the current I2 in which the current value gradually increases in a negative direction with a defined slope from zero amperes is generated as well at the secondary leakage inductance L2. Further, at the primary side of the transformer 8, as indicated by the dashed line in FIG. 7, the electric current flows in the path that is configured as follows: the electric current reaches the primary winding 8*a* from the node A of the input capacitors 3*a* and 3*b*, reaches the node B via the primary winding 8*a*, and after that, reaches the input terminal 2*b* via the first switch 6 in the ON state.

This electric current corresponds to the current Iq2 that flows in the first switch 6 in the ON state, and at the same time, corresponds to the current I1 that flows in the primary side leakage inductance L1. This current I1 is obtained by adding the current Im that flows in the excitation inductance Lm and the current I2 that flows in the secondary side leakage inductance L2. Therefore, the electric currents (that is, the currents Iq2 and I1) that flow in the path explained above is obtained by adding the current Im and the current I2 in which the current value gradually increases with a predetermined slope from zero amperes. Therefore, with respect to the electric currents (that is, the currents Iq2 and I1) that flows in the path explained above during the fifth operation state st5, when the current value of the current Im at the point of an end time of the fourth operation state st4 is configured to an initial value, the current value gradually increases. Further, at the point of an end time of the fifth operation state st5, the current value increases to the current value that is obtained by adding the current value of the increased current I2 and the current value of the current Im at this point. That is, as the current value of the current I2 increases, it can be possible to increase the current value of the current (that is, the currents Iq2 and I1) that flows in the path explained above by the increased current amount of the current I2 as compared with the configuration in which the fifth operation state st5 is not provided.

Figure 8:
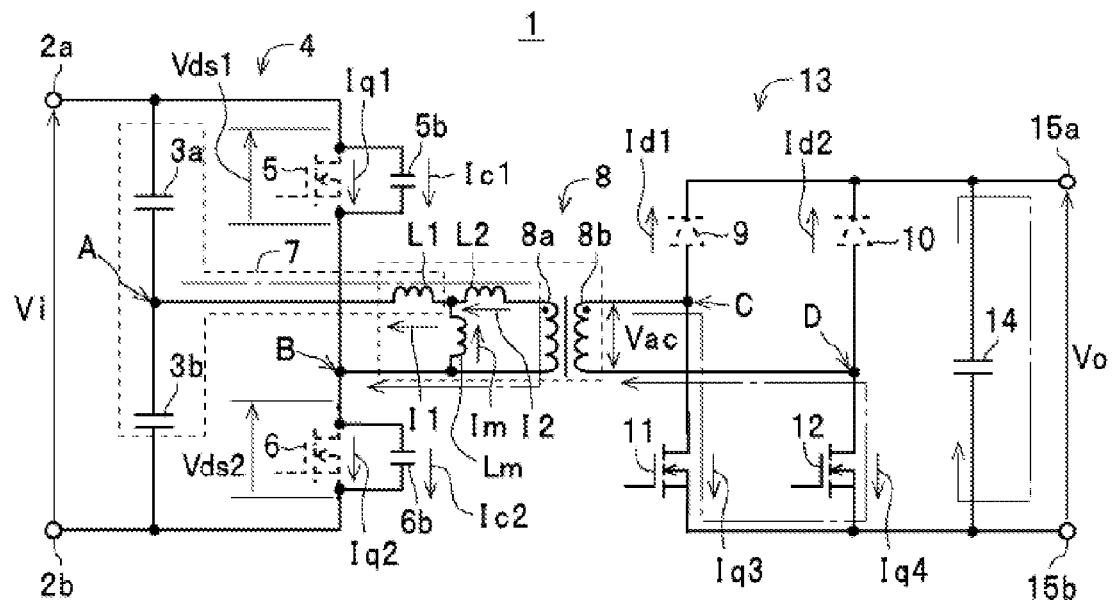
FIG. 8 is a circuit diagram to explain an operation in a sixth operation state st6 of the current resonance DC-DC converter 1 according to an embodiment of the present invention.

Next, an operation of the DC-DC converter 1 in the sixth operation state st6 is explained with reference to FIGS. 2 and 8. In the sixth operation state st6, as shown in FIG. 8, flow directions of the electric currents that flow in the primary winding 8*a* and the secondary winding 8*b* of the transformer 8 are opposite. However, the ON and OFF state with respect to the first switches 5 and 6, the ON and OFF state with respect to the diodes 9 and 10, and the ON and OFF state with respect to the second switches 11 and 12 are the same as the states in the third operation state st3. Therefore, the basic operation is the same as the third operation state st3. Because both of the first switches 5 and 6 are in the OFF states in the same way as in the third operation state st3, the period of the sixth operation state st6 corresponds to the dead time period as well.

In the DC-DC converter 1 according to the embodiment of the present invention, the configuration in which the fifth operation state st5 explained above is shifted to the sixth operation state st6 is adopted. In the fifth operation state st5, because the current value of the current I1 increases due to the electric current that is generated at the secondary winding 8*b* of the transformer 8 as explained above, each of the total amount of the electric charges of the currents Ic1 and Ic2 that flow during the sixth operation state st6 increases. Therefore, in the sixth operation state st6, the voltage between both ends of the parasitic capacitance 6*b* (the voltage Vds2 with respect to the first switch 6) certainly increases from zero volts up to mostly the same voltage as the input voltage Vi. Further, the voltage between both ends of the parasitic capacitance 5*b* (the voltage Vds1 with respect to the first switch 5) certainly decreases from mostly the same voltage as the input voltage Vi to zero volts. As a result, the preparation for the zero volt switching with respect to the first switch 5 can be always and normally completed.

As explained above, in the DC-DC converter 1, the one second switch 11 is shifted to be the ON state somewhat earlier than the commencement of the dead time period (the period of the sixth operation state st6) that is provided immediately before the ON period (the entire period of the first operation state st1 and the second operation state st2 in the ON states) of the one first switch 5 of the pair of the first switches 5 and 6 by the control circuit 16. At the same time, the one second switch 11 stays in the ON state throughout the predetermined period of time until a termination of the dead time period (the period of the third operation state st3) that is provided immediately after the ON period of the other first switch 5 by the control circuit 16. The other second switch 12 is shifted to be the ON state somewhat earlier than the commencement of the dead time period (the period of the third operation state st3) that is provided immediately before the ON period (the entire period of the fourth operation state st4 and the fifth operation state st5 in the ON states) of the other first switch 6 of the pair of the first switches 5 and 6 by the control circuit 16. At the same time, the other second switch 12 stays in the ON state throughout the predetermined period of time until a termination of the dead time period (the period of the sixth operation state st6) that is provided immediately after the ON period of the other first switch 6 by the control circuit 16.

Therefore, according to the DC-DC converter 1 of the embodiments of the present invention, immediately before the start (the commencement) of the dead time period (the period of the sixth operation state st6) that is immediately before the first operation state st1 in which the other first switch 5 in OFF state is shifted to be the ON state, the pair of the second switches 11 and 12 that are provided at the secondary side of the transformer 8 are shifted to be the ON states at the same time. Thus, both ends of the secondary winding 8*b* are short-circuited by the second switches 11 and 12. As a result, the period of the fifth operation state st5, in which the electric current having the increased current value (the currents Iq3 and Iq4 that flow in the second switches 11 and 12 and in which the current value increases) is generated at the secondary winding 8*b*, can be provided.

Therefore, in the DC-DC converter 1, also with respect to the current I2 that flows in the secondary side leakage inductance L2 that is equivalently formed at the primary side of the transformer 8 in the fifth operation state st5, the current value of the current I2 can be increased according to the current value of the electric current that is generated at the secondary winding 8*b*. As a result, the electric current that flows in the primary winding 8*a* (the current Iq2 that flows in the other first switch 6 in the ON state, i.e., the current I1 that flows in the primary side leakage inductance L1) can be increased. Therefore, in the dead time period (the period of the sixth operation state st6) immediately after the fifth operation state st5, the current amount of the currents Ic1 and Ic2 that respectively flow in the parasitic capacitances 5*b* and 6*b* of the first switches 5 and 6 composing the current I1 that continuously flows in the primary side leakage inductance L1 can also be increased. As a result, the parasitic capacitance 5*b* can be certainly discharged by the current Ic1 in which the current amount is increased. Further, the voltage between both ends of the parasitic capacitance 5*b*, i.e., the voltage Vds1 between the source terminal and the drain terminal of the one first switch 5 can be decreased to zero volt. As a result, the preparation for the zero volt switching with respect to the first switch 5 can be always and normally completed.

Further, according to the DC-DC converter 1, even immediately before the start (the commencement) of the dead time period (the period of the third operation state st3) that is immediately before the fourth operation state st4 in which the other first switch 6 in the OFF state is shifted to the ON state, the pair of the second switches 11 and 12 that are provided at the secondary side of the transformer 8 are shifted to be the ON states at the same time. Thus, both ends of the secondary winding 8*b* are short-circuited by the second switches 11 and 12. As a result, the period of the second operation state st2, in which the electric current having the increased current value (the currents Iq3 and Iq4 that flows in the second switches 11 and 12 and in which the current value increases) is generated at the secondary winding 8*b*, can be provided.

As a result, in the DC-DC converter according to the embodiment of the present invention, in the second operation state st2, the current amount of the current I2 that flows in the secondary side leakage inductance L2 can be increased as well according to the current value of the electric current that is generated in the secondary winding 8*b*. As a result, the electric current (the current Iq1 that flows in the one first switch 5 in the ON state, i.e., the current I1 that flows in the primary side leakage inductance L1) that flows in the primary winding 8*a* can be increased. Therefore, in the dead time period (the period of the third operation state st3) immediately after the second operation state st2 operation state, the current amount of the currents Ic1 and Ic2 that respectively flow in the parasitic capacitances 5*b* and 6*b* of the first switches 5 and 6 composing the current I1 that continuously flows in the primary side leakage inductance L1 can also be increased. As a result, the parasitic capacitance 6*b* can be certainly discharged by the current Ic2 in which the current value is increased. Further, the voltage between both ends of the parasitic capacitance 6*b*, i.e., the voltage Vds2 between the source terminal and the drain terminal of the other first switch 6 can be decreased to zero volts. As a result, the preparation for the zero volt switching with respect to the first switch 6 can be always and normally completed.

Therefore, during the period of the first operation state st1 in which the first switch 5 is the ON state and during the period of the fourth operation state st4 in which the first switch 6 is the ON state, the DC-DC converter 1 according to the embodiment of the present invention can certainly make the first switches 5 and 6 of the primary side of the transformer 8 perform the zero volt switching regardless of the electric current value of the current I2 (the transmission electric current) that flows in the secondary side leakage inductance L2, and at the same time, without enlarging the current Im (the excitation current) that flows in the excitation inductance Lm.

Further, as an example, in the DC-DC converter 1 explained above, the following configuration is adopted. A shifting time, in which the second switch 11 at the secondary side of the transformer 8 that synchronously performs the ON and OFF operation with the first switch 5 at the primary side of the transformer 8 is shifted to the OFF state, is in synchronization with a shifting time, in which the first switch 6 is shifted to the ON state after the first switch 5 is shifted to the OFF state. Further, a shifting time, in which the second switch 12 at the secondary side of the transformer 8 that synchronously performs the ON and OFF operation with the first switch 6 at the primary side of the transformer 8 is shifted to the OFF state, is in synchronization with a shifting time, in which the first switch 5 is shifted to the ON state after the first switch 6 is shifted to the OFF state. However, the present invention is not limited to the above configurations. For example, a shifting time, in which the second switch 11 that synchronously performs the ON and OFF operation with the first switch 5 is shifted to the OFF state, can be delayed a little bit to a shifting time, in which the first switch 6 is shifted to the ON state after the first switch 5 is shifted to the OFF state. Further, a shifting time, in which the second switch 12 that synchronously performs the ON and OFF operation with the first switch 6 is shifted to the OFF state, can be delayed a little bit to a shifting time, in which the first switch 5 is shifted to the ON state after the first switch 6 is shifted to the OFF state.

The current resonance DC-DC converter being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:
1. A current resonance DC-DC converter, comprising:
a transformer that has a primary winding and a secondary winding;
a switching circuit that is connected to the primary winding, the switching circuit having:
a pair of first and second primary side switches which alternately perform ON and OFF operations with intervening first and second dead time periods during which the first and second primary side switches perform the OFF operations; and
a bridge configuration;
an AC-DC conversion circuit that is connected to the secondary winding, the AC-DC conversion circuit:
having four rectifying devices;
converting an alternating current voltage induced in the secondary wiring to a direct current voltage; and
outputting the direct current voltage;
two of the four rectifying devices located at a reference potential side being a pair of first and second secondary side switches which alternately perform the ON and OFF operations; and
a control circuit that alternately turns the first and second primary side switches ON and OFF with intervening the first and second dead time periods, the control circuit:
synchronously turning the first primary and first secondary side switches ON and OFF; and
synchronously turning the second primary and second secondary side switches ON and OFF, wherein
the first dead time period is provided immediately after an expiration of an ON period of the second primary side switch until immediately before an initiation of an ON period of the first primary side switch,
the second dead time is provided immediately after an expiration of the ON period of the first primary side switch until immediately before an initiation of the ON period of the second primary side switch,
a first lag time period is provided immediately before the first dead time period so that the first lag time overlaps with the ON period of the second primary side switch,
a second lag time period is provided immediately before the second dead time period so that the second lag time period overlaps with the ON period of the first primary side switch,
the control circuit turns the first secondary side switch ON at an initiation of the first lag time period and turns the first secondary side switch OFF at an expiration of the second dead time period so that the ON period of the second primary side switch and an ON period of the first secondary side switch are overlapped with each other during the first lag time period, and
the control circuit turns the second secondary side switch ON at an initiation of the second lag time period and turns the second secondary side switch OFF at an expiration of the first dead time period so that the ON period of the first primary side switch and an ON period of the second secondary side switch are overlapped with each other during the second lag time period.

2. The current resonance DC-DC converter according to claim 1, wherein
the control circuit keeps the first secondary side switch turned ON starting from the initiation of the first lag time period and ending at the expiration of the second dead time period, and
the control circuit keeps the second secondary side switch turned ON starting from the initiation of the second lag time period and ending at the expiration of the first dead time period.

3. The current resonance DC-DC converter according to claim 1, wherein
the first and second secondary side switches are in ON states during the first and second lag time periods.

4. The current resonance DC-DC converter according to claim 1, wherein the first and second dead time periods are respectively longer than the first and second lag time periods.

5. The current resonance DC-DC converter according to claim 4, wherein
the control circuit keeps the first secondary side switch turned ON starting from the initiation of the first lag time period and ending at the expiration of the second dead time period, and
the control circuit keeps the second secondary side switch turned ON starting from the initiation of the second lag time period and ending at the expiration of the first dead time period.

6. The current resonance DC-DC converter according to claim 5, wherein
the first and second secondary side switches are in ON states during the first and second lag time periods.

7. A method for operating a current resonance DC-DC converter, comprising:
providing the current resonance DC-DC converter, the current resonance DC-DC converter including:
a transformer that has a primary winding and a secondary winding;
a switching circuit that is connected to the primary winding, the switching circuit having:
a pair of first and second primary side switches which alternately perform ON and OFF operations with intervening first and second dead time periods during which the first and second primary side switches perform the OFF operations; and
a bridge configuration;
an AC-DC conversion circuit that is connected to the secondary winding, the AC-DC conversion circuit:
having four rectifying devices;
converting an alternating current voltage induced in the secondary wiring to a direct current voltage; and
outputting the direct current voltage,
two of the four rectifying devices located at a reference potential side being a pair of first and second secondary side switches which alternately perform the ON and OFF operations; and
a control circuit that alternately turns the first and second primary side switches ON and OFF with intervening the first and second dead time periods, the control circuit:
synchronously turns the first primary and first secondary side switches ON and OFF; and
synchronously turns the second primary and second secondary side switches ON and OFF, wherein
the first dead time period is provided immediately after an expiration of an ON period of the second primary side switch until immediately before an initiation of an ON period of the first primary side switch,
the second dead time is provided immediately after an expiration of the ON period of the first primary side switch until immediately before an initiation of the ON period of the second primary side switch,
the control circuit turns the first secondary side switch ON before an initiation of the first dead time period and before the control circuit turns the first primary side switch ON,
after the control circuit turns the first primary side switch OFF, the control circuit turns the first secondary side switch OFF at an expiration of the second dead time period, the control circuit turns the second secondary side switch ON before the initiation of the second dead time period and before the control circuit turns the second primary side switch ON, after the control circuit turns the second primary side switch OFF, the control circuit turns the second secondary side switch OFF at the expiration of the first dead time period, the ON period of the second primary side switch and an ON period of the first secondary side switch are overlapped with each other before the first dead time period, and the ON period of the first primary side switch and an ON period of the second secondary side switch are overlapped with each other before the second dead time period.

8. The method for operating a current resonance DC-DC converter according to claim 7, wherein the control circuit keeps the first secondary side switch turned ON starting before the initiation of the first dead time period and ending at the expiration of the second dead time period, and the control circuit keeps the second secondary side switch turned ON starting before the initiation of the second dead time period and ending at the expiration of the first dead time period.

9. The method for operating a current resonance DC-DC converter according to claim 7, wherein the first and second secondary side switches are in ON states during a predetermined period prior to the initiation of each of the first and second dead time periods.

10. The method for operating a current resonance DC-DC converter according to claim 7, wherein an overlapped ON period of the second primary side switch and the first secondary side switch is shorter than each of the first and second dead time periods, and an overlapped ON period of the first primary side switch and the second secondary side switch is shorter than each of the first and second dead time periods.

11. The method for operating a current resonance DC-DC converter according to claim 10, wherein the control circuit keeps the first secondary side switch turned ON starting before the initiation of the first dead time period and ending at the expiration of the second dead time period, and the control circuit keeps the second secondary side switch turned ON starting before the initiation of the second dead time period and ending at the expiration of the first dead time period.

12. The method for operating a current resonance DC-DC converter according to claim 11, wherein the first and second secondary side switches are in ON states during a predetermined period prior to the initiation of each of the first and second dead time periods.

13. The current resonance DC-DC converter according to claim 1, wherein the ON period of the first secondary side switch and the ON period of the second secondary side switch are overlapped with each other at least during the first and second lag time periods.

14. The current resonance DC-DC converter according to claim 13, wherein the ON period of the first secondary side switch and the ON period of the second secondary side switch are overlapped with each other during the first and second dead time periods and the first and second lag time periods.

15. The method for operating a current resonance DC-DC converter according to claim 9, wherein the first and second secondary side switches are in the ON states during the first and second dead time periods.

16. The method for operating a current resonance DC-DC converter according to claim 12, wherein the first and second secondary side switches are in the ON states during the first and second dead time periods.

* * * * *